United States Patent [19]

Lewchalermwong

[11] Patent Number: 4,808,393

[45] Date of Patent: Feb. 28, 1989

[54] PROCESS FOR MANUFACTURE OF FERRIC NITRATE

[75] Inventor: C. Charles Lewchalermwong, Charlotte, N.C.

[73] Assignee: Mineral Research and Development Corp., Charlotte, N.C.

[21] Appl. No.: 98,090

[22] Filed: Sep. 18, 1987

[51] Int. Cl.$^4$ ............................................. C01B 21/48
[52] U.S. Cl. ................................................... 423/395
[58] Field of Search ......................................... 423/395

[56] References Cited

U.S. PATENT DOCUMENTS

| | | |
|---|---|---|
| 1,385,769 | 7/1921 | Ball . |
| 2,053,518 | 9/1936 | Crittendon ........................... 423/395 |
| 2,581,519 | 2/1948 | Critchley ............................. 423/395 |
| 3,888,973 | 6/1975 | Colwell et al. ...................... 423/395 |
| 4,305,846 | 12/1981 | Jennings .............................. 423/395 |

FOREIGN PATENT DOCUMENTS

| | | |
|---|---|---|
| 52-15496 | 2/1977 | Japan . |
| 2209 | 1/1983 | Japan .................................... 423/395 |

OTHER PUBLICATIONS

*Dictionary of Commercial Chemicals*, 3rd Edition, p. 149.

*Primary Examiner*—Robert L. Stoll
*Assistant Examiner*—Wayne A. Langel
*Attorney, Agent, or Firm*—Timothy R. Kroboth

[57] ABSTRACT

A novel process for the manufacture of an aqueous ferric nitrate solution is provided. This process overcomes the passivation problem associated with the reaction of nitric acid and iron. The process is effected at a critical reaction temperature less than the ferric nitrate-to-ferric oxide decomposition temperature, thereby yielding a reaction product low in ferric oxide. The process involves repeated cycling of nitric acid through a bed of pieces of iron.

3 Claims, No Drawings

PROCESS FOR MANUFACTURE OF FERRIC NITRATE

TECHNICAL FIELD

The present invention relates to the production of ferric nitrate by the reaction of iron and nitric acid. More specifically, this invention relates to producing an aqueous ferric nitrate solution containing a high, soluble ferric iron concentration.

BACKGROUND ART

As noted in U.S. Pat. No. 3,888,973 to Colwell et al, passing a liquid reactant through a bed of solid particle reactants by gravity or hydrostatic pressure is known. Also known, as exemplified by Japanese patent document No. 52-15496, is the production of ferrous nitrate by passing ferric nitrate through a tube filled with pieces of scrap iron.

As illustrated by U.S. Pat. No. 1,385,769 to Ball, iron compounds may be produced by passing upwardly through a vessel containing pieces of metallic iron, a stream of an oxidizing medium including a solution of ferrous sulfate, and air. When air is admitted under pressure, it causes violent agitation of the ferrous sulfate solution and exerts a lifting action, causing a rise of the solution within the vessel and overflow.

U.S. Pat. No. 2,581,519 to Critchley exemplifies the manufacture of a metal nitrate from nitric acid and a suitable metal such as silver, by immersing a column of bars of the metal in a cold solution of the metal nitrate, heating while displacing air from the solution with oxygen, simultaneously introducing nitric acid and oxygen, and displacing the metal nitrate solution with freshly formed nitrate solution.

As illustrated by the *Dictionary of Commercial Chemicals*, 3rd Ed., the production of ferric nitrate by dissolving scrap iron in concentrated nitric acid, and crystallizing, is known. However, passivation of the metallic iron reactant is a serious problem. As a result of passivation, the reaction will proceed slowly and stop before the scrap iron is completely dissolved.

Passivation would be lessened by heating. However, a substantial limitation on the usefulness of heating to lessen passivation, is that the ferric nitrate-to-ferric oxide decomposition temperature is about 100° C. Ferric oxide contamination is undesirable. Furthermore, the use of heat typically translates into increased cost.

Dissolving iron powder, rather than scrap iron, in concentrated nitric acid would substantially overcome the passivation problem. However, iron powder is a prohibitively expensive starting material.

Thus, the discovery of a low cost, economical process for making ferric nitrate that overcomes the passivation problem, would constitute a significant contribution to the art. Such a process could be used for manufacturing an aqueous ferric nitrate solution containing a high concentration of soluble ferric iron. By the term "high" in this context, is meant, for purposes of this invention, 8% or more of the ferric iron. Such a process would contribute even further to the art if it provided an aqueous ferric nitrate solution high in soluble ferric iron, further characterized by less than 300-500 ppm of insoluble ferric oxide.

DISCLOSURE OF THE INVENTION

It is accordingly an object of the present invention to provide a low cost, economical process for manufacturing ferric nitrate that overcomes the passivation problem.

It is a further object of the present invention to provide a process of this type that can be used for producing an aqueous ferric nitrate solution high in soluble ferric iron.

It is an even further object to provide a process that yields an aqueous ferric nitrate solution high in soluble ferric iron and low in insoluble ferric oxide.

Additional objects, advantages and novel features of the present invention are set forth in the description that follows, and in part will become apparent to those skilled in the art upon examination of the following description or may be learned by practice of the invention.

To achieve the foregoing objects and in accordance with the purpose of the present invention, as embodied and broadly described herein, there is provided a process for the manufacture of an aqueous ferric nitrate solution high in soluble ferric iron and low in insoluble ferric oxide. The process is carried out at a critical reaction temperature that is less than the temperature at which ferric nitrate decomposes to ferric oxide.

In the process, nitric acid is continuously gravity-flowed through a bed of iron pieces, with the continuous flow being controlled to provide a certain nitric acid-iron surface contact time. The contact time is long enough to produce ferric nitrate, but sufficiently short that the ferric nitrate is washed from the iron surface before a passivating coating is formed thereon.

Effluent collected from the bed of iron, is repeatedly cycled through the bed, employing continuous, controlled gravity-flow, until the aqueous ferric nitrate solution is produced. The effluent contains unreacted nitric acid. With each cycle, the effluent is increasingly enriched in ferric nitrate and further depleted in unreacted nitric acid.

BEST MODE FOR CARRYING OUT THE INVENTION

As explained earlier, the present invention is directed to a novel process for manufacturing ferric nitrate that overcomes the passivation problem associated with the reaction of metallic iron and nitric acid. Beneficially, my unique process is able to produce an aqueous ferric nitrate solution containing a high concentration of soluble ferric iron. Advantageously, the process can yield a solution including about 10% or more soluble ferric iron, with the production of a solution containing about 11% to 12.5% of the ferric iron being facile.

Furthermore, my novel process can provide an aqueous ferric nitrate solution high in soluble ferric iron and low in insoluble ferric oxide. By the term "low" is meant, for purposes of this invention, less than about 300-500 ppm of ferric oxide. Beneficially, the reaction product of my process is high in soluble ferric iron and includes less than about 10-100 ppm of ferric oxide.

Desirably, my process is able to produce an aqueous ferric nitrate solution high in soluble ferric iron, low in insoluble ferric oxide, and further including about 7% or less free nitric acid, and if necessary, no more than about 1-2% free nitric acid. The presence of about 3-7% free nitric acid may prevent or lessen ferric nitrate crystallization.

Broadly speaking, the process of the present invention involves continuously flowing nitric acid through a bed of pieces of metallic iron, and then repeatedly cycling through the bed, unreacted nitric acid-containing effluent collected from the bed of iron pieces. Each cycle yields a reaction product increasingly enriched in ferric nitrate. The cycling step is continued until a desired ferric nitrate concentration is produced. This process, when carried out using an appropriate nitric acid-iron surface contact time, overcomes passivation of the iron surface. As a result, the process may be conducted without the application of heat to, or without pressurizing, the reaction mixture. In other words, the process may be conducted at ambient temperature and pressure.

A further simplifying feature of my unique process is the use of gravity to effect flow of the nitric acid through the bed of iron pieces. For purposes of this description, because my process utilizes liquid flow, the term "gravity" is intended to include hydrostatic pressure.

Unlike more complicated processes described earlier for carrying out other reactions, I do not need to bubble air through the iron bed or add oxygen to the reactor.

In my process, I form a bed of metallic iron in a reactor, from pieces or masses of iron. For purposes of this description, the terms "pieces" and "masses" are intended to convey an identical meaning, and are particularly intended to differentiate the form of the iron reactant from an iron powder. Scrap iron, particularly scrap iron low in manganese, is a preferred source of pieces of iron useful in my process. Desirably, the iron pieces are supported within the reactor on a perforated disk.

The nitric acid used in my process is suitably a commercially available concentrate. However, for instance, a solution of nitric acid and ferric nitrate could, if desired, alternatively be used as a starting material. By "concentrate" or "concentrated" is meant, for purposes of this description, about 30-40% or more nitric acid. An advantageous aqueous concentrated nitric acid, for use as a reactant in my process, contains about 56% nitric acid. If desired, a concentrate containing about 70; % nitric acid could be used.

The chemical equation that describes the chemical reaction characterizing my process, is as follows:

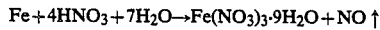

$Fe + 4HNO_3 + 7H_2O \rightarrow Fe(NO_3)_3 \cdot 9H_2O + NO \uparrow$

The ratio of nitric acid to metallic iron, to be used in the process, may be selected according to the stoichiometry shown in this chemical equation. Advantageously, a stoichiometric ratio of about 4-5 parts of $HNO_3$ to about 1 part of Fe is used.

If an aqueous ferric nitrate solution containing about 11.5-12.5% soluble ferric iron, about 3 to 6 or 7% free nitric acid, and less than about 10-100 ppm of insoluble ferric oxide is desired, a ratio of about 7.7 parts of concentrated nitric acid containing 56% nitric acid to about 1 part of metallic iron (equivalent to about 4.3 parts of $HNO_3$ to 1 part of Fe) should be selected. If desired, an aqueous solution containing about 100% of the ferric nitrate product shown in the chemical equation, can be made by my process.

As noted earlier, a key aspect of this unique process is the nitric acid-iron surface contact time. The importance of this feature of my invention is that formation of a passivating coating on an iron surface, when iron is reacted with nitric acid, is a serious problem. Passivation of the iron causes ferric nitrate production to proceed slowly and cease. To overcome the passivation problem, my process continuously gravity-flows nitric acid through the bed of iron pieces in a certain controlled manner so as to provide an appropriate nitric acid-iron surface contact time. Specifically, the rate of gravity flow is controlled to produce a contact time long enough to produce ferric nitrate, but sufficiently short to provide for continuous rinsing of the iron surface so as to wash away the ferric nitrate before a passivating coating forms.

The rate of gravity-flow through the bed of iron masses typically will depend upon, for instance, the packing density of the bed of iron masses, the height of the bed and the liquid head pressure. For simplicity, I prefer to use the packing density as a rate-controlling factor. To provide an appropriate nitric acid-iron surface contact time, the bed of iron masses should be loosely packed, not densely packed. A relatively denser packing increases the contact time, whereas a relatively less dense packing decreases the contact time.

Unlike the Ball and Critchley patents, discussed earlier, I do not use a tall column of pieces of metal, as a relatively shorter column provides for relatively less contact time.

A key overall objective in controlling the rate of gravity-flow is to provide for an effluent output from the bed of iron pieces that is greater than or equal to the liquid input to the bed. In other words, gravity-flow that prevents stagnation or pooling within the bed, should be used. Otherwise, the nitric acid-iron surface contact time may eventually increase until passivation occurs, resulting in reaction failure. A suitable rate of gravity-flow is achievable by simply adjusting the bed packing density and the liquid input to the bed, relative to each another. For instance, in the case of a laboratory scale reaction, a liquid input of about 20 ml/min. could be provided by a circulating pump, and the bed of iron masses could be packed at a density that provides for about 20 ml/min. effluent from the bed.

As pointed out earlier, an effluent enriched in ferric nitrate and containing unreacted nitric acid, is repeatedly cycled through the bed of iron masses to provide an effluent increasingly enriched in ferric nitrate and further depleted in nitric acid. Recycling is continued until a desired ferric nitrate concentration is obtained.

A peristaltic pump may advantageously be used to return effluent to the bed of iron pieces, as a peristaltic pump will channel the effluent through tubing only. In other words, if a conventional water pump were used, the effluent would also contact the pump blades, resulting in blade corrosion and possible fluid contamination. For a laboratory scale reaction, a peristaltic pump available under the trademark Masterflex from Cole-Parmer could be used. Such a pump with an appropriate pump head will deliver about 20 ml of liquid per minute.

The reaction of nitric acid and iron is exothermic, and is accompanied by the release of a red offgas, as the nitric acid flows through the bed of iron masses. As the process continues, the temperature in the reaction zone, as determined by a thermometer intermittently inserted into the iron bed, increases. The reaction zone temperature is the critical temperature in the process. This temperature remains below 100° C., the ferric nitrate-to-ferric oxide decomposition temperature, but may reach a maximum of about 90° to 96° or 98° C. Thus, the use of externally applied heat could push the critical temperature to 100° C. or higher, with the production of unwanted ferric oxide.

In the Example that follows and throughout this description and the claims set forth below, all percentages are by weight/weight, and all procedures are carried out at ambient temperature and pressure, unless otherwise specified.

EXAMPLE

To a three-neck, 1000 ml round bottom flask, there is added 462 g of concentrated nitric acid containing 56% nitric acid. The stem of a conventional 4", 60° funnel is inserted through the center neck of the round bottom flask, and a plug of glass wool is placed at the funnel apex. Above the glass wool plug, a bed of scrap iron metal (60 g, ratio of 7.7:1 of 56% nitric acid to iron) is loosely formed. The height of the bed is 5 cm, measured from the funnel apex. The dimensions of the pieces of scrap iron are 4 cm × 1.5 cm × 1 mm.

A thermometer is placed in one side neck of the three-neck flask. Through the other side neck, one end of a section of nitric acid-resistant tubing is introduced, and the tubing end is submerged in the nitric acid. The nitric acid is pumped from the flask through the tubing, and delivered through the other tubing end over the bed of scrap iron, by a peristaltic pump. The peristaltic pump delivers 20 ml of liquid per minute.

An exothermic reaction which is accompanied by the production of a red offgas, occurs as the nitric acid reacts with the iron as it flows by gravity through the bed of metallic iron. Effluent from the bed of iron is enriched in ferric nitrate and contains unreacted nitric acid. The effluent is passed by the funnel stem into the three-neck flask where it mixes with fresh nitric acid.

In a continuous manner, the flask contents are delivered to, and flow through, the bed of scrap iron; and ferric nitrate-enriched effluent passes into, and mixes with, the flask contents. A steady state of input-output occurs, as 20 ml/min. of flask contents are delivered to the bed of iron and about 20 ml/min. of effluent passes into the three-neck flask.

As the process continues, the temperature in the reaction zone, as determined by a thermometer intermittently inserted into the iron bed, increases. Eventually, the reaction zone temperature reaches a maximum of 93° C.

The process is continued until the flask contents are an aqueous ferric nitrate solution (sp.gr. 1.544) containing 11.75% ferric iron. The reaction product includes less than 10 ppm ferric oxide, and has 7% free nitric acid. About 2 g of scrap iron remains in the funnel. The length of time of the process is roughly two hours.

The above example is illustrative of the present invention. It is to be understood that this example is not in any way to be interpreted as limiting the scope of the invention. Rather, it is intended that the scope of the invention be defined by the claims set forth below. I contemplate that the invention as hereinafter claimed, will be subject to various modifications, which modifications are within the scope thereof.

INDUSTRIAL APPLICABILITY

The unique process of this invention is capable of providing an aqueous ferric nitrate solution high in soluble ferric iron and low in insoluble ferric oxide.

What is claimed is:

1. A process for the manufacture of an aqueous ferric nitrate solution comprising a high soluble ferric iron concentration and low in insoluble ferric oxide, said process being carried out at a critical reaction temperature less than the ferric nitrate-to-ferric oxide decomposition temperature, and producing nitrogen oxide gas as a by-product, wherein said process comprises the steps of
(a) continuously gravity-flowing nitric acid through a bed of pieces of metallic iron, the continuous flow being controlled to provide a nitric acid-iron surface contact time sufficiently long to produce ferric nitrate, but sufficiently short that said ferric nitrate is washed from the iron surface before a passivating coating is formed thereon, and then
(b) cycling through said bed of iron pieces by employing said continuous, controlled gravity flow, until said aqueous ferric nitrate solution is produced, unreacted nitric acid-containing effluent collected from said bed of metal, said effluent being increasingly enriched in ferric nitrate and further depleted in unreacted nitric acid by the cycling.

2. The process of claim 1, wherein said aqueous ferric nitrate solution comprises a minimum of about 11.75 wt. % soluble ferric iron, less than about 10 ppm ferric oxide, and about 3–7 wt. % free nitric acid.

3. The process of claim 1, wherein a stoichiometric ratio of about 4 to 5 parts of $HNO_3$ to about 1 part of Fe is used.

* * * * *